US009223802B2

(12) United States Patent
Morrison et al.

(10) Patent No.: US 9,223,802 B2
(45) Date of Patent: Dec. 29, 2015

(54) AUTOMATIC SHARING OF SUPERLATIVE DIGITAL IMAGES

(75) Inventors: Andrew Morrison, Bellevue, WA (US); Chris Park, Seattle, WA (US); Kevin Lau, Issaquah, WA (US); Parthu Kishen, Renton, WA (US); Desmond Smith, Seattle, WA (US); Michael Bibik, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 113 days.

(21) Appl. No.: 13/041,372

(22) Filed: Mar. 5, 2011

(65) Prior Publication Data

US 2012/0191709 A1    Jul. 26, 2012

Related U.S. Application Data

(60) Provisional application No. 61/435,757, filed on Jan. 24, 2011.

(51) Int. Cl.
*G06F 17/30* (2006.01)
(52) U.S. Cl.
CPC .... *G06F 17/30247* (2013.01); *G06F 17/30265* (2013.01)
(58) Field of Classification Search
USPC .................................. 707/737, 758, 748, 752
See application file for complete search history.

(56) References Cited

U.S. PATENT DOCUMENTS

| 7,003,515 | B1 | 2/2006 | Glaser et al. | |
| 7,467,222 | B2 * | 12/2008 | Kacker | 709/232 |
| 7,779,117 | B2 * | 8/2010 | Tessman et al. | 709/224 |
| 8,589,367 | B2 | 11/2013 | Sighart et al. | |
| 8,676,803 | B1 | 3/2014 | Leung et al. | |
| 2003/0187844 | A1 | 10/2003 | Li et al. | |
| 2004/0025180 | A1 | 2/2004 | Begeja et al. | |
| 2006/0203261 | A1 | 9/2006 | Kacker | |
| 2008/0141307 | A1 | 6/2008 | Whitehead | |
| 2009/0254539 | A1 | 10/2009 | Wen et al. | |
| 2009/0292732 | A1 | 11/2009 | Manolescu | |
| 2010/0125568 | A1 | 5/2010 | van Zwol et al. | |
| 2010/0131500 | A1 | 5/2010 | van Leuken et al. | |
| 2011/0182482 | A1 * | 7/2011 | Winters et al. | 382/116 |
| 2012/0158717 | A1 | 6/2012 | Unay et al. | |
| 2012/0188382 | A1 | 7/2012 | Morrison et al. | |
| 2012/0188405 | A1 | 7/2012 | Morrison et al. | |
| 2012/0189284 | A1 | 7/2012 | Morrison et al. | |

OTHER PUBLICATIONS

U.S. Appl. No. 13/041,361—Non Final Office Action Mailed Mar. 14, 2013, 9 pages.
U.S. Appl. No. 13/041,361—Final Office Action Mailed Nov. 6, 2013, 13 pages.

(Continued)

*Primary Examiner* — Belix M Ortiz Ditren

(57) ABSTRACT

Described herein are techniques related to automatic sharing of superlative digital images. Such techniques include an automatic selection of one or more superlative digital images from a set of digital images based, at least in part, upon weighted criteria regarding properties (e.g., metadata or content) of the digital images. Instead, interested parties (e.g., subscribers and/or persons with an association with a particular image) are notified automatically. This Abstract is submitted with the understanding that it will not be used to interpret or limit the scope or meaning of the claims.

23 Claims, 6 Drawing Sheets

(56) References Cited

OTHER PUBLICATIONS

U.S. Appl. No. 13/041,361—Non Final Office Action Mailed Jul. 2, 2014, 14 pages.
U.S. Appl. No. 13/041,361—Final Office Action Mailed Jan. 16, 2015, 20 pages.
U.S. Appl. No. 13/041,369—Non Final Office Action Mailed Aug. 28, 2013, 10 pages.
U.S. Appl. No. 13/041,369—Final Office Action Mailed May 6, 2014, 10 pages.
U.S. Appl. No. 13/041,369—Non Final Office Action Mailed Dec. 2, 2014, 10 pages.
U.S. Appl. No. 13/041,370—Non Final Office Action Mailed Oct. 24, 2012, 12 pages.
U.S. Appl. No. 13/041,370—Final Office Action Mailed Jul. 17, 2013, 14 pages.
U.S. Appl. No. 13/041,370—Pre-Brief Appeal Conference Decision Mailed Mar. 4, 2014, 2 pages.
U.S. Appl. No. 13/041,370—Notice of Abandonment Mailed Sep. 9, 2014, 2 pages.
U.S. Appl. No. 13/041,369—Notice of Allowance Mailed Jun. 18, 2015, 5 pages.

* cited by examiner

AUTOMATIC SHARING OF SUPERLATIVE DIGITAL IMAGES

RELATED APPLICATIONS

This application claims the benefit of priority to U.S. Provisional Patent Application Ser. No. 61/435,757, filed on Jan. 24, 2011, the disclosure of which is incorporated by reference herein.

BACKGROUND

With the widespread use of digital consumer electronic image-capturing devices such as digital cameras and camera/video phones, the size of consumers' digital image collections continue to increase very rapidly. As such collections grow ever larger and increasingly more unwieldy, a person is less able to handle the sheer volume of images in these collections.

A user may capture hundreds or thousands (or more) of digital photographs and videos over the course of time using image-capturing and multiuse devices. The task of organizing captured photographs often falls to the user of the device. Some conventional approaches provide a crude user interface that allows a user to sift through photographs using a timeline. Other conventional approaches allow a person to manually tag and organize photographs into virtual albums.

Software applications that manage media (e.g., digital photographs and videos) collections have become widely adopted as the amount of digital media, including images, has grown. Because of their large display, processing power, and memory capacity, most of these conventional approaches are concentrated on use with personal "desktop" computers. Using ample room of the desktop computer's large displays, the desktop user interface offers a broad workspace for a user to view and manage a large catalogue of digital photographs.

As evidenced by the seeming ubiquity of mobile personal communication devices (e.g., the so-called "smartphones"), mobile communication and computing technology has rapidly developed. With the processing power and memory capacity of such mobile technology, it is possible to have large media collections on mobile personal communication devices or have access to such collections via high-speed data telecommunication networks.

While the power and memory capacities have increased, a typical mobile personal communication device still has a small display and, consequently, more constrained user interface capabilities than a desktop computer. Accordingly, a user of a typical mobile personal communication device is forced to abandon his mobile environment and move to a desktop computer in order to view and manage his large media catalogue.

SUMMARY

Described herein are techniques related to automatic sharing of superlative digital images. Such techniques include an automatic selection of one or more superlative digital images (e.g., the "best" images) from a set of digital images based, at least in part, upon weighted criteria. Rather than manually sifting through a large collection of digital images to find the "best" ones, a superlative subset of digital images are automatically selected based upon various weighted criteria regarding properties (e.g., metadata or content) of the digital images. Subscribers are notified when the superlative subset is updated. In addition, people who are associated with one or more of the images in the superlative subset are notified about the superlative subset. In this way, the owner of the digital images need not manually notify interested parties (e.g., subscribers and/or people with an association with a particular image) when the owner's collection of best photos (for example) is updated. Instead, interested parties are notified automatically.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components

DETAILED DESCRIPTION

Figure 1:
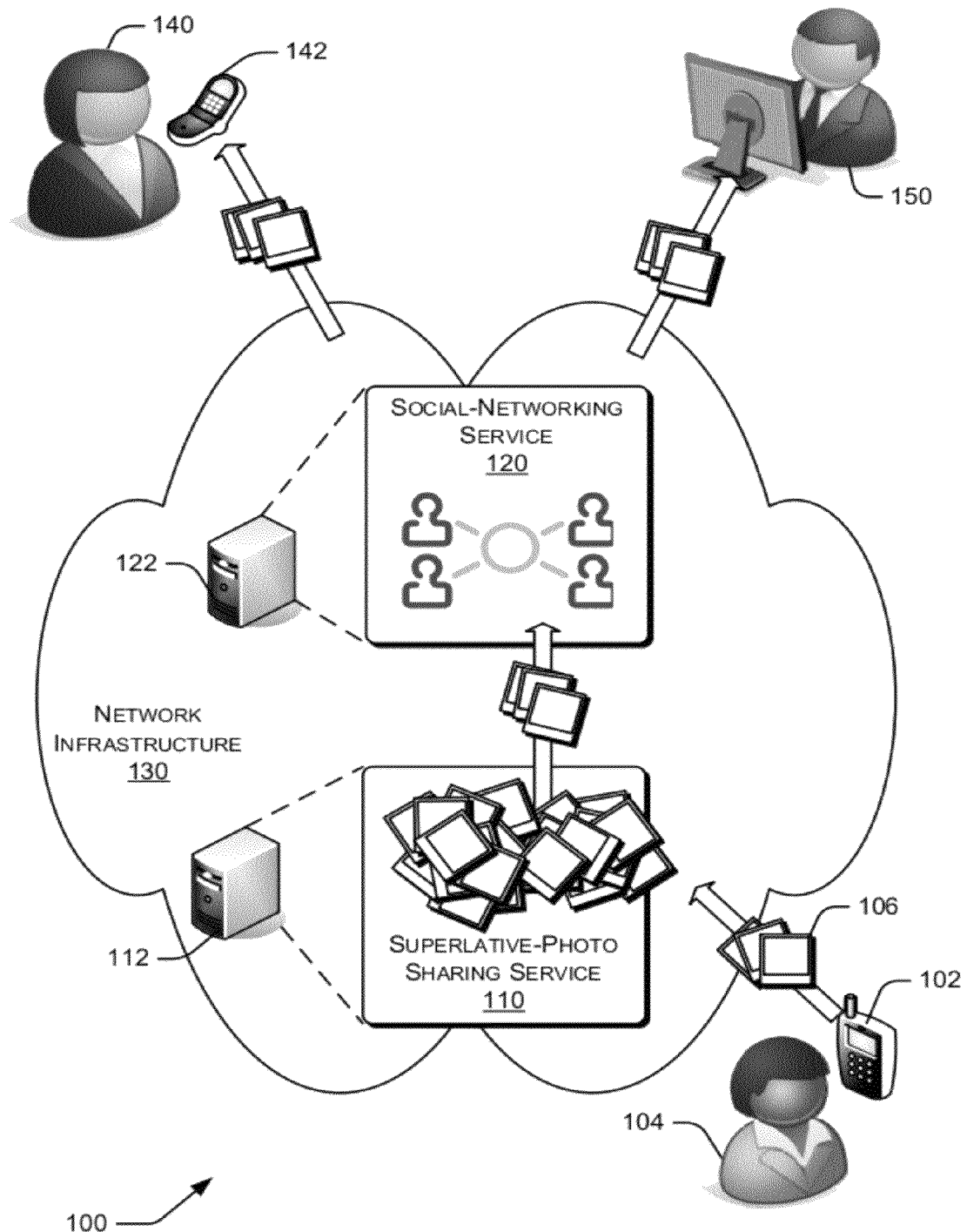
FIG. 1 illustrates an exemplary scenario within which the techniques described herein may be employed for automatic sharing of one or more superlative digital images from a set of digital images.

Described herein are techniques related to automatic sharing of superlative digital images. Such techniques include an automatic selection of one or more superlative digital images from a set of digital images based, at least in part, upon weighted criteria. As used herein with regard to digital images, the term "superlative" refers to a subset of digital images having the highest kind, quality, or order with respect to the other digital images or sets. For example, digital images that are top-ranked or bottom-ranked in some category or characteristic are superlative. Also, for example, digital images considered the "best" or "worst" of the set are considered superlative.

Using an image-capturing device (such as a digital camera or camera-equipped cellphone), a user accumulates a large collection of digital images by, for example, taking a multitude of photographs over several days, weeks, or even months. Rather than manually sifting through the large collection to find her "best" digital images ("photos" herein), a superlative-photo sharing service automatically selects superlative (e.g., "best") photos based upon various weighted criteria regarding properties (e.g., metadata and/or content) of the photos.

The superlative-photo sharing service may be, for example, an application running on a user's smartphone, a cloud-based service (using cloud-based resources), an application running on a server on a network (such as the Internet), or some combination thereof. The superlative-photo sharing service may be associated with or be incorporated into a social-networking services (e.g., Facebook™, MySpace™, Twitter™, Linkedin™, Ning™, and the like) or photo/video sharing services (e.g., Flickr™, Photobucket™, Picasa™, Shutterfly™, and the like).

On its own (or through an associated social networking or photo/video sharing service, the superlative-photo sharing service may notify subscribers when a new or updated superlative subset is available. In addition, people who are associated with one or more of the photos in the superlative subset are notified about the superlative subset or about the particular associated photos. In this way, the owner of the photo set need not manually notify interested parties (e.g., subscribers and/or people with an association with a particular image) when the owner's collection of superlative photos (e.g., "best") is updated. Instead, interested parties are notified automatically.

An example of an embodiment of a superlative-photo sharing service that employs the new image auto-selection and sharing techniques described herein may be referred to as an "exemplary superlative-photo sharing service." While one or more example embodiments are described herein, the reader should understand that the claimed invention may be practiced using different details than the exemplary ones described herein.

The following co-owned U.S. Patent Applications are incorporated by reference herein:

U.S. Provisional Patent Application Ser. No. 61/435,757, filed on Jan. 24, 2011;

U.S. patent application Ser. No. 13/041,361, titled "Automatic Selection Of Digital Images With An Apparatus," filed on Mar. 5, 2011;

U.S. patent application Ser. No. 13/041,369, titled "Automatic Selection Of Digital Images From a Multi-Sourced Collection," filed on Mar. 5, 2011; and U.S. patent application Ser. No. 13/041,370, titled "Automatic Highlight Reel Producer," filed on Mar. 5, 2011.

Exemplary Scenario for an Exemplary Superlative-Photo Sharing Service

FIG. 1 illustrates an exemplary scenario 100 within which the techniques described herein may be employed. Using her camera-equipped smartphone 102, Dorothy 104 takes about twelve hundred photos during a summer vacation sightseeing and visiting relatives in Texas. Before taking her vacation, Dorothy subscribed to a superlative-photo sharing service 110.

Dorothy's smartphone 102 is just one example of an image-handling device that might be used with the techniques described herein. Dorothy 104 might use some other device with the capability to capture, collect, and/or manipulate digital images. Examples of such alternative devices include (but are not limited to) the following: tablet-based computer, other handheld computer, netbook, computer, digital camera, digital camcorder, handheld multimedia device, GPS navigational system, vehicle-based computer, or other portable electronics.

In this exemplary scenario 100, Dorothy has a photo-sharing application on her phone provided by her wireless service provider and linked to her account on a social-networking service 120. The ways that she may have subscribed to the service include (but are not limited to):

via a stand-alone website;

by downloading and installing a so-called "app" (i.e., application) onto her phone;

via a service offered by or in association with a social-networking service;

via a service offered by or in association with a photo/video sharing service;

via a feature offered by her mobile wireless service provider (e.g., T-mobile™); or some combination thereof.

Without any prompting from Dorothy 104, the photo-sharing app on her smartphone 102 uploads her new photos 106 to the superlative-photo sharing service 110 on a network infrastructure 130. The upload may occur, for example, when each new photo is taken, after a defined period of time (e.g., a day), if there are new photos, after a defined number of photos are taken, and at her request, etc.

The upload to the network infrastructure 130 may be accomplished via a so-called cellular communications technology. However, the described techniques can be used in conjunction with non-cellular technologies such as conventional analog AM or FM radio, Wi-Fi™, wireless local area network (WLAN or IEEE 802.11), WiMAX™ (Worldwide Interoperability for Microwave Access), Bluetooth™, and other analog and digital wireless voice and data transmission technologies. Alternative implementations might utilize a wired connection.

The network infrastructure 130 may be a private or public network of computing or telecommunication resources. It may include the Internet. The network infrastructure 130 has a multitude of resources. As depicted in FIG. 1, one or more servers 112 host the superlative-photo sharing service 110 and one or more servers 122 host the social-networking service 120.

In some implementations, the network infrastructure 130 may be called a cloud-computing infrastructure. In that context, the cloud's data centers may include a plurality of servers that provide computing resources, as well as data storage and retrieval capabilities. Users of a cloud-computing infrastructure generally do not need knowledge regarding or control over the underlying data center infrastructure of the "cloud." Rather, the users may access the computing resources and data storage capabilities on an as-needed basis.

Once uploaded, the superlative-photo sharing service 110 processes the collection of uploaded photos and automatically selects the top-ranked (i.e., best) photos of the collection. Alternatively, the service may select the bottom-ranked (i.e., worst) photos of the collection.

Without any additional input from Dorothy 104, the superlative-photo sharing service sends a notification via the associated social-networking service 120 to interested parties. For example, since Jill 140 subscribed to Dorothy's "best photos" via the social-networking service 120, a link to the updated best photos is sent to Jill's phone 142 via a text message. When Paul 150 checks his email, he discovers copies of photos with his grandchildren in them. Paul didn't subscribe like Jill did. Instead, an association was made within the superlative-photo sharing service 110 between Paul 150 and his grandchildren. When his grandchildren appear in one of Dorothy's collection of best photos, the superlative-photo sharing service 110 automatically generates and sends Paul 150 an email with copies of or links to photos of his grandchildren.

So, with little effort from Dorothy, her best photos are automatically shared with interested parties (e.g., her friends and family). These photos are shared in a timely manner (e.g., perhaps while she is still on the trip) rather than weeks after her vacation and after manually sifting through her photos.

Exemplary Processes

FIGS. 2-5 are flowcharts illustrating exemplary processes 200, 300, 400, and 500 that implement the techniques described herein for automatic sharing of superlative photos. The exemplary processes 200, 300, 400, and 500 are performed, at least in part, by an image-capturing device, such as device 102 of FIG. 1, an image-capturing telecommunications device 610 of FIG. 6, and/or a resource of a cloud-computing infrastructure (like the superlative-photo sharing service 110 of FIG. 1).

At 202 and 204, the process 200 waits for a trigger to start processing a set 206 of digital photos. Examples of appropriate triggers include (but are not limited to):

- arrival of one or more new photos (e.g., via a capture on a device or uploading to a cloud-based service);
- a reoccurring scheduled day/time (e.g., 2:00 A.M every day);
- passage of a defined period of time (e.g., twelve hours);
- events (e.g., a explicit request from friend or family member);
- context (e.g., over thirty miles of travel, as detected by a location-detection subsystem of a device);
- conditions (e.g., at intervals of one hundred in the set 206); or
- some combination thereof.

The set 206 of digital photos is the collection of photos that the process operates upon to select a superlative subset. The set 206 may be located (e.g., stored or maintained) on an image-capturing device (such as the smartphone 102 in FIG. 1), some other image-storage device, a server, and/or a network or cloud-based resource.

Alternatively, the set 206 may be less than all of a total collection of photos owned or associated with a user (such as Dorothy 104). The set 206 may be one of multiple clusters of a larger group of photos owned or associated with the user. The process may cluster photos based on one or more criteria, such as location, time, date, and calendar information from one or more events, such as those on private and/or publicly available calendars. Additionally, the clustering criteria may also consider event specifics, such as faces in a series of images, colors associated with images including overall brightness, color similarities or dissimilarities, and scene information. Clusters of images may be multilayered. For example, a cluster of wedding images may have a number of secondary clusters. One secondary cluster may include images of just the groom and bride, where another secondary cluster may include images of just the bridesmaids.

Figure 4:
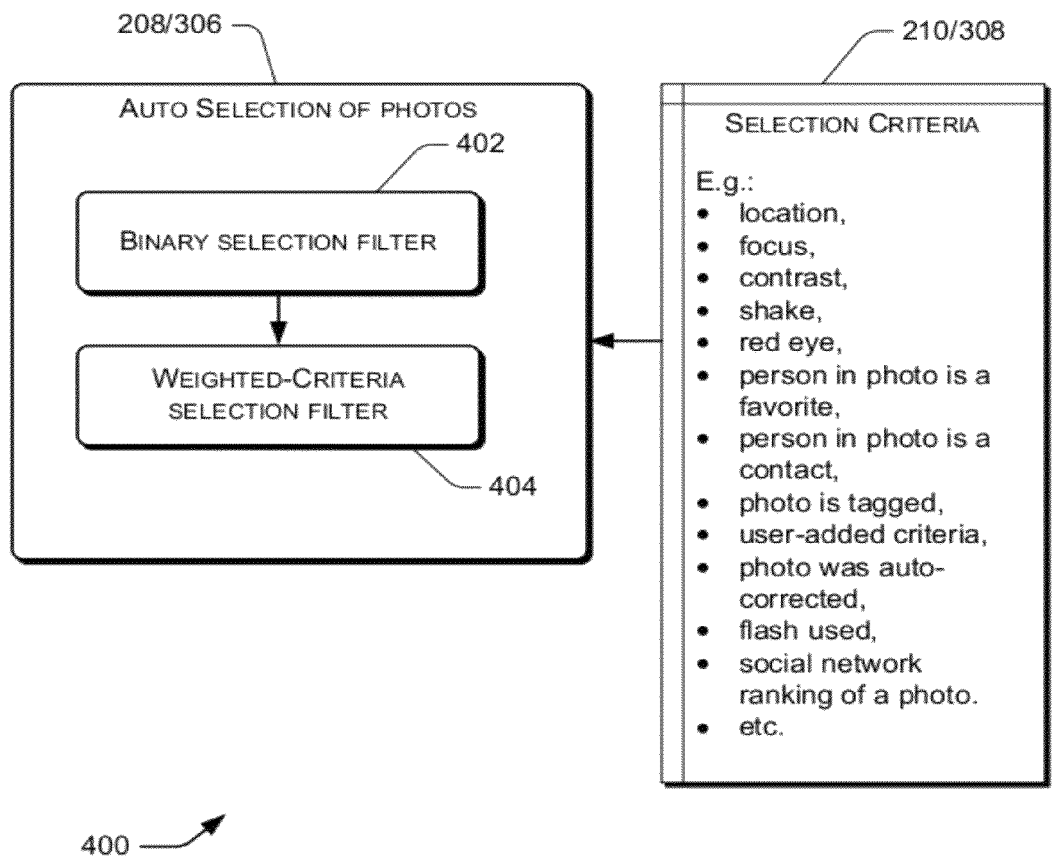

Once the process is triggered, at 208, the process 200 auto-selects a superlative subset of the set 206 of digital photos. As used herein, the subset presumptively includes some, but not all of, the digital images of the set 206. The auto selection is based upon one or more weighted selection criteria 210 of one or more properties of the photos. FIG. 4 provides more information regarding both the auto-selection operation 208 and the selection criteria 210. The auto-selection operation 208 may be designed to find the "best" photos (i.e., the top-ranked photos). Alternatively, it may be designed to find the "worst" photos (i.e., the bottom-ranked photos).

At 212, the auto-selected superlative photos are automatically sent to the users (e.g., other users on the social-networking service 120 of FIG. 1) who have subscribed the user's "best" photos, for example.

At 214, the process uses pre-existing or user-defined association rules 216 and the photos' metadata to determine (e.g., find) an association between particular superlative photos and particular users. For example, the user may have defined a rule associating "best photos" of her daughter with the user's parents. So, at 216, the process makes an association between the user's parents and the "best photos" having metadata indicating her daughter is in the photos.

At 218, the determined superlative photos associated with particular users are sent to those particular users. Rather than sending copies of the photos, notifications about associated photos (with links to such photos) may be sent to the particular users. For example, the user's parents may receive a notification via a social-networking service about the availability of associated photos of the user's daughter. Alternatively, copies or notifications of the entire subset of superlative photos may be sent to particular users.

In another example, the user may have defined a rule that assigns metadata to images captured with a portable device and sent via MMS to a particular user. Those same images may be automatically sent to the same user, in high resolution format, once the portable device is coupled to a high bandwidth node, such as WiFi™. Alternatively, images that are shared using the portable device may be augmented with metadata indicating prior sharing. The automatic sharing process may consider such augmented metadata and automatically update devices, nodes coupled on a user's home network, and the superlative-photo sharing service.

Figure 3:
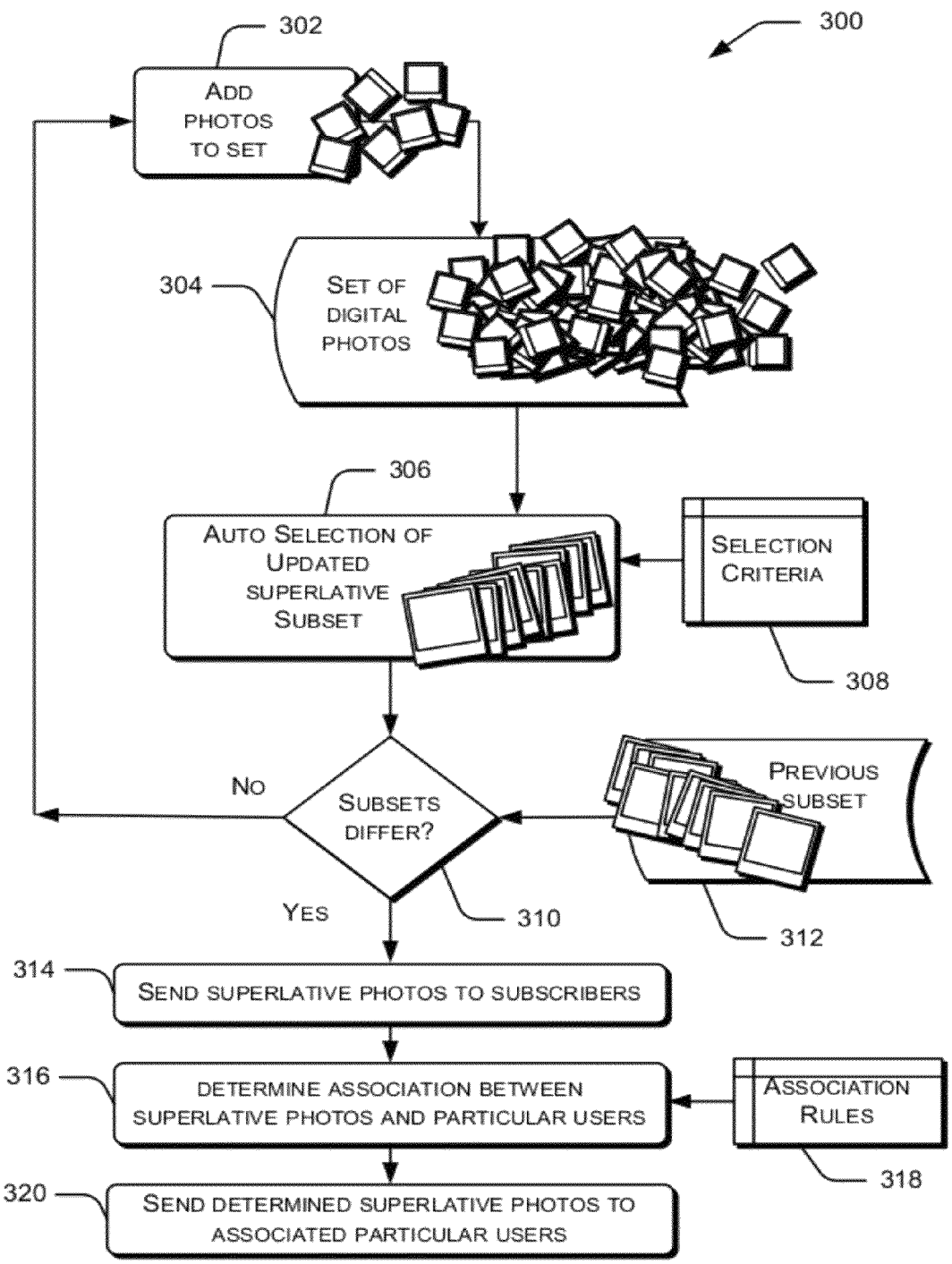

FIG. 3 shows the process 300, which is another implementation of the techniques described herein for automatic sharing of superlative photos. With this implementation, interested parties (e.g., subscribers and/or users associated with photos in the superlative subset) are only notified if there are one or more new photos in the superlative subset as compared to previous subsets. For example, a guy will only be notified of a "best" photo of his girlfriend if it is new.

At 302, the process 300 produces an updated set 304 of digital images by adding one or more new digital images to a previous set of digital images.

Next, at 306, the process automatically selects, based upon weighted selection criteria 308, an updated superlative subset of digital images of the updated set 304. The auto selection is based upon one or more weighted selection criteria 308 of one or more properties of the photos. FIG. 4 provides more information regarding both the auto-selection operation 306 and the selection criteria 308. The auto-selection operation 306 may be designed to find the "best" photos (i.e., the top-ranked photos). Alternatively, it may be designed to find the "worst" photos (i.e., the bottom-ranked photos).

At 310, the process determines if the just selected updated superlative subset differs from a previously selected superlative subset 312 (which was derived from the previous set of digital images). That is, is there at least one photo different between the two subsets? If not, that means that the one or more new photos added to the set 304 of digital photos did not supplant any of photos that were in the superlative subset. If that is the case, then the process returns back to the beginning.

At 314, the updated auto-selected superlative photos are automatically sent to the users (e.g., other users on the social-networking service 120 of FIG. 1) who have subscribed to the owner's superlative photos. Alternatively, just the new photo may be sent if the subscribed user had been notified of the others.

At 316, the process uses pre-existing or user-defined association rules 318 and the photos' metadata to determine (e.g., find) an association between particular superlative photos and particular users. For example, the user may have defined a rule associating "best photos" of her daughter with the user's parents. So, at 316, the process makes an association between the user's parents and the "best photos" having metadata indicating her daughter is in the photos.

At 320, the determined superlative photos associated with particular users are sent to those particular users. Rather than sending copies of the photos, notifications about associated photos (with links to such photos) may be sent to the particular users. For example, the user's parents may receive a notification via a social-networking service about the availability of associated photos of the user's daughter. Alternatively, copies or notifications of the entire subset of superlative photos may be sent to the particular users.

Figure 2:
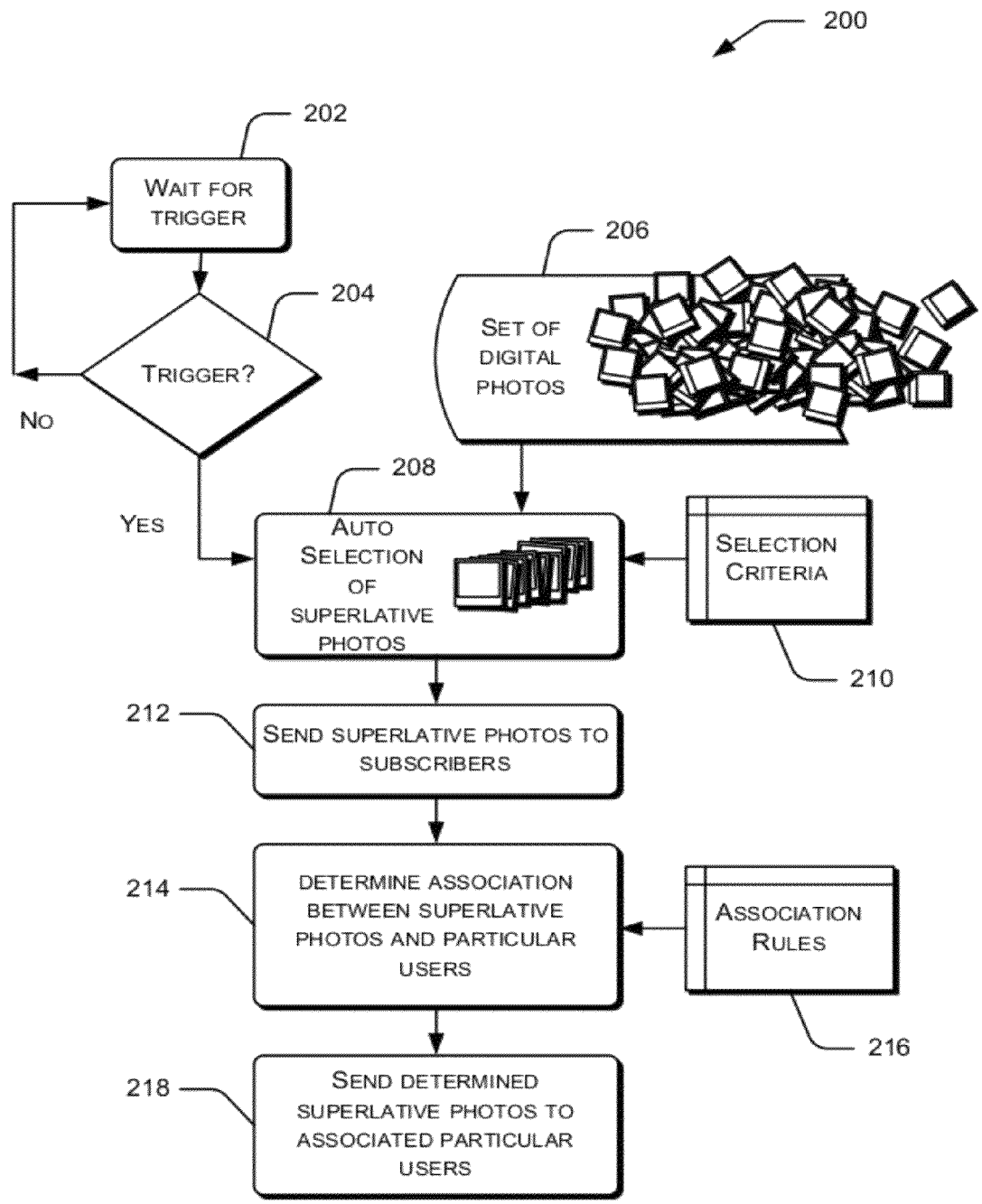
FIGS. 2-5 are flowcharts of processes that are configured to implement the techniques described herein for automatic sharing of one or more superlative digital images from a set of digital images.

FIG. 4 shows the process 400 and offers more details regarding the auto-selection operations 208, 306 and the selection criteria 210, 308 of FIGS. 2 and 3. The auto-selection operation 208/306 includes a binary selection filter operation 402 followed by a weighted-criteria selection filter operation 404. At 402, one of more of the criteria 210/308 may be applied as a binary filter to, for example, remove photos that do not meet the one or more criteria. After that, at 404, one or more of the criteria are applied in a weighted manner.

Generally, the main purpose of the binary selection filter operation 302 is to remove outright "bad" photos. So, it could be called the bad-photo filter. A bad photo is one where the content is difficult for a human to discern and simple post-processing is not likely to make the content discernable. The binary filter may use one or more criteria related to one or more properties that might make a photo be considered "bad." Examples of such "bad photo" criteria include (but are not limited to): shaky, blurry, over or under exposed, poor resolution, poor contrast, out-of-focus, red-eye, and the like. Red-eye might not be part of the binary selection filter operation 302 in some implementations because it can be removed with some post-processing.

Some implementations may not employ the binary selection filter operation 302. Those implementations may rely upon the weighted-criteria selection filter operation 304 to remove the "bad" photos.

Alternatively, the binary selection filter operation 402 may be described as grouping a larger superset of digital images into the set 206 (or 304) of digital images (i.e., an intermediate grouping) that includes two or more of the superset of digital images. Similarly, the weighted-criteria selection filter operation 404 may be alternatively described as ranking the digital images of the set 206 (or 304) of digital images based upon one or more of the multiple weighted criteria 210/308 and designating an allotment of top-ranked (or bottom-ranked) digital images of the intermediate grouping as the selected subset of digital images that results from the auto-selection operation 208/306.

The size (i.e., number, cardinality) of the allotment may be a fixed number (e.g., one or ten) or calculated. If fixed, the allotment size may be a factory-set default number or a user-defined number. If calculated, the calculation may be, for example, based upon linear or non-linear proportions of the quantity of photos in the set 206/304, in one or more clusters, in the intermediate grouping, and/or the like. These proportions may be factory-set or user-defined. A percentage is an example of such proportions.

For example, the allotment size for the subset may be user-defined to be five percent of the set 206/304 of photos. If, for this example, the set 206/304 included twelve-hundred sixty-two photos, then the allotment size would be sixty-two (with truncation). Consequently, the subscribers and other interested parties may follow a link to a site that shows them sixty-two photos as being the superlative subset.

Typically, the criteria used for the binary filtering differ from those used for the weighted filtering. However, in some implementations, the criteria used for one may overlap the criteria used for the other. The criteria are related to properties of a photo. Those properties may be derived from the content of the photo (based upon an image analysis) and/or from metadata associated with the photo. Examples of photo metadata include (but are not limited to): technical metadata (such as size, resolution, color profile, ISO speed and other camera settings), descriptive metadata (captions, headlines, titles, keywords, location of capture, etc.), and administrative metadata (such as licensing or rights usage terms, specific restrictions on using an image, model releases, provenance information, such as the identity of the creator, and contact information for the rights holder or licensor).

The weighted selection criteria 210/308 include (by way of example and not limitation): identification of the image-capture device, identification of the photographer, location of image-capture, focus, contrast, shake, red eye, person in photo is a favorite (e.g., in a social network or on the device), person in photo is a contact, photo is tagged (in general or with a particular tag), user-added criteria, photo was auto-corrected, flash was used, social network ranking of a photo, etc.

Figure 5:
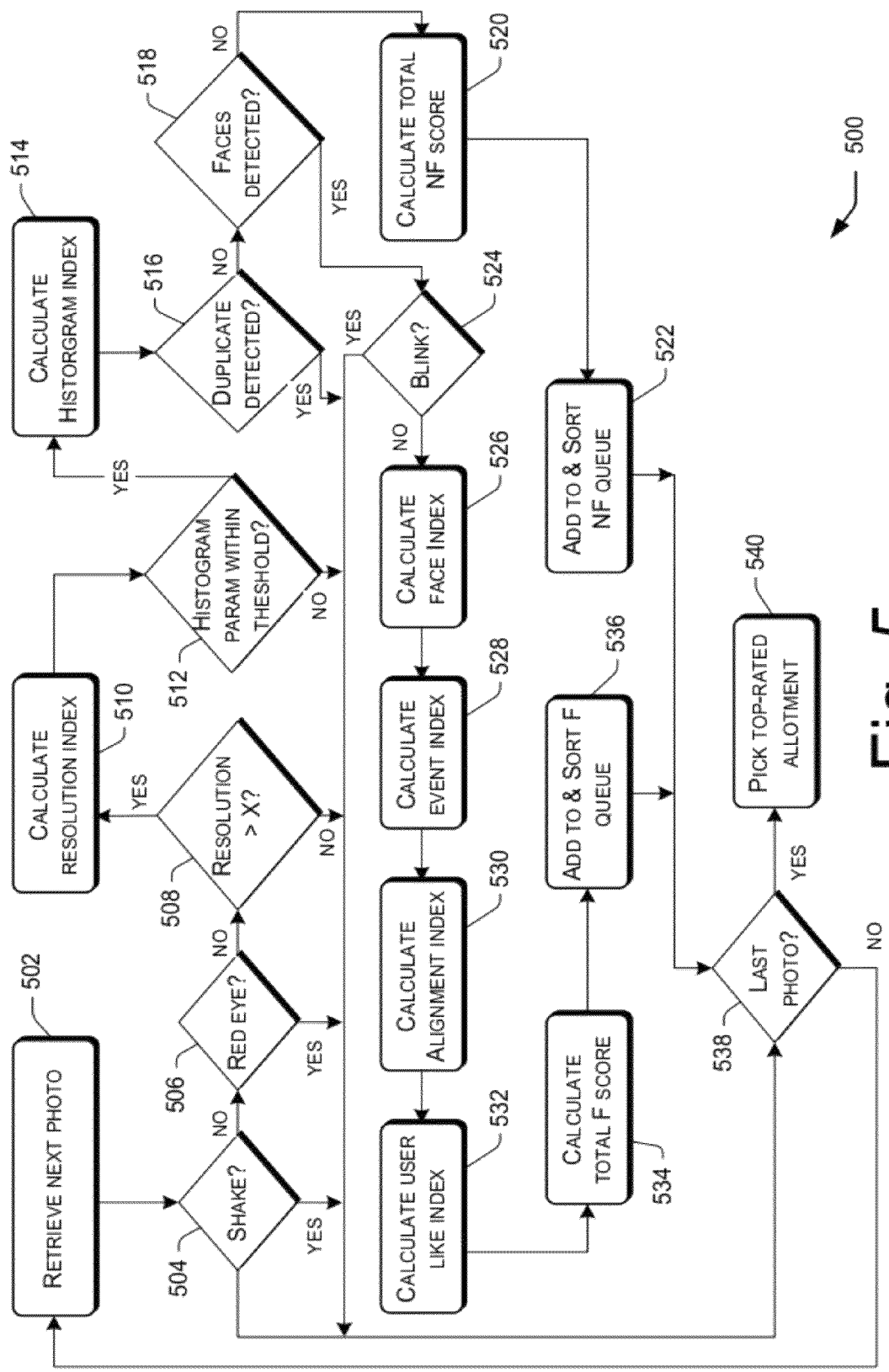

FIG. 5 illustrates the process 500 for determining one or more superlative photos that may be used with embodiments described herein. This process 500 may be employed as part of process 200 and/or process 400 herein.

The process 500 starts with operation 502 where the process retrieves the next photo (or the first when initially executed) from a memory. Next, at 504 and 506, a determination is made if the retrieved photo is shaky or if redeye is detected. If so, a next photo is retrieved and the process 500 starts again with the next image. If the retrieved photo is the last (as determined at operation 538), then the process 500 proceeds to a photo-ranking operation 540, which is discussed later.

If no shake or redeye are detected, then the process 500 continues onto operation 508 where it is determined if the resolution of the retrieved photo is greater than a defined threshold resolution. If not, then a next photo is retrieved and the process begins again. If so, based on the resolution of the image, a resolution index is determined or calculated at operation 510. In one example, the resolution index may be determined or calculated based on the resolution (megapixels) associated with a photo undergoing consideration. Next, at 512, the process determines if the histogram associated with the photo is within a defined threshold. If not, then a next photo is retrieved and the process begins again. If so, based on the histogram of the photo, a histogram index is determined or calculated at 514. In one example, the histogram index is determined or calculated based on a consideration of the number of "dark" pixels (underexposure), "bright" pixels (overexposure), and/or the number of pixels that fall between the underexposure and overexposure range.

Next, the process continues, at 516, to determine if a duplicate photo of the one currently being processed is stored in the device or otherwise known or available. If so, a next photo is retrieved and the process begins again. If not, the process determines, at 518, if one or more faces are detected in the photo. If no faces are detected in the photo, the process calculates, at 520, a NF ("no face") photo score based on the calculated resolution index and histogram index, and associates the NF score with the photo and adds the photo to a "no face" image queue at 522. If one or more faces is detected, the process determines, at 524, if a subject in the photo has their eyes shut or partially shut (i.e., "blink detection"). If a blink is detected, a next photo is retrieved and the process begins again.

If no blink is detected, the process calculates face, event, alignment and user like indexes at operations 526, 528, 530, 532, respectively. In one implementation, the face index calculation considers if one or more expected or desired faces are in a photo, the event index calculation considers if an expected event (e.g., wedding or party) is part of a photo, the alignment calculation considers a degree of alignment (e.g., vertical or horizontal) of a photo and the user like index considers a relative user acceptance or approval (e.g., like or dislike) of one or more faces in a photo. These indexes and the previously calculated indexes associated with resolution and histogram are considered when calculating an F ("face") photo score at 534. The face image score is associated with the photo and the photo is added to a face queue at 536.

Each time a photo is added to a queue, the queue is automatically resorted based on scores associated with already processed and queued photos. Once the last photo is processed (as determined by operation 538), the process picks the highest scored photo as the superlative (e.g., "best") photo at 540. In addition, operation 540 may also select, based on photo score, a set of photos as the superlative set.

In alternative implementations, other criteria (like those of 218 in FIGS. 2 and 4) and/or different permutations of criteria may be employed at operations 504, 506, 508, 516, 518, and 524. For example, with operations 504, 506, and 508 other "bad photo" type criteria may be used and with operations 516, 518, and 524 other weighed selection criteria may be employed.

Exemplary Device within Exemplary Telecommunication Environment

Figure 6:
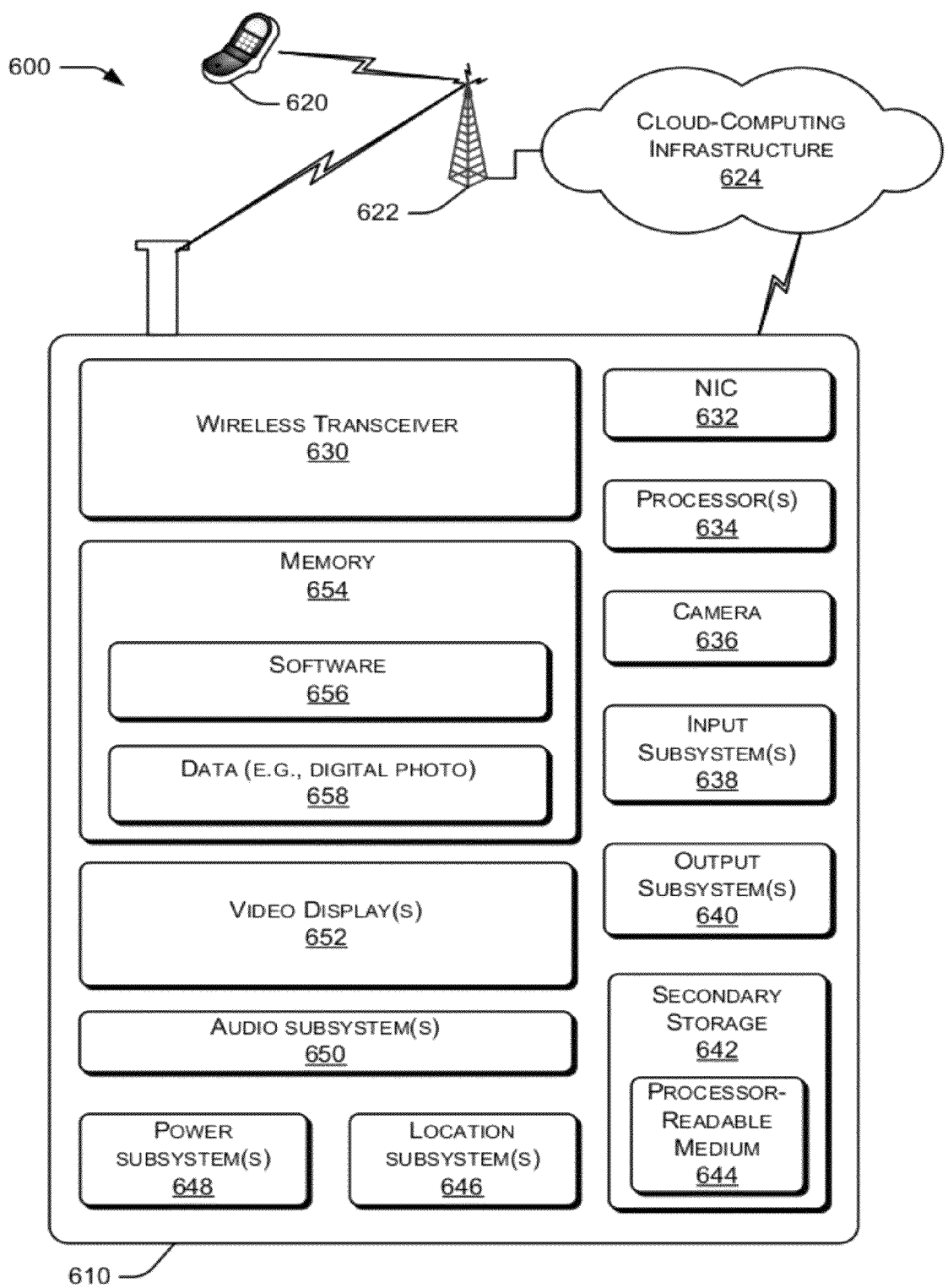
FIG. 6 depicts an image-capturing telecommunications apparatus within a telecommunications environment. The depicted apparatus is configured to implement the techniques described herein for automatic sharing of one or more superlative digital images from a set of digital images.

FIG. 6 shows an exemplary telecommunication environment 600 which includes an image-capturing telecommunications device 610. Both the environment 600 and the device 610 may be included as part of one or more implementation of the techniques described herein.

As depicted, the device 610 is a smartphone that is capable of communicating using analog and/or digital wireless voice and/or data transmission. FIG. 6 shows the device 610 in communication with a cell phone 620 via a so-called cellular network as represented by cell tower 622. Via that cellular network 622 or via some other wireless or wired communication technology (e.g., Wi-Fi™, WiMAX™, WLAN, Ethernet, etc.), the device 610 is coupled to a cloud-computing infrastructure 624.

The cloud-computing infrastructure 624 may include scalable and virtualized computer resources over a private or public network. Typically, a cloud-computing infrastructure uses the internet and central remote servers to maintain data and applications. The cloud-computing infrastructure 624 includes a group of individual computers connected by high-speed communications and some form of management software guiding the collective actions and usage of the individual computers. This technology allows for much more efficient computing by centralizing storage, memory, processing and bandwidth. While depicted in FIG. 6 as the cloud-computing infrastructure, item 624 may alternatively be viewed as a network or the Internet.

The device 610 includes many components, such as a wireless transceiver 630, a NIC (network interface controller) 632, one or more processors 634, one or more cameras 636, one or more input subsystems 638, one or more output subsystems 640, a secondary storage 642 with at least one processor-readable medium 644, one or more location subsystems 646, one or more power subsystems 648, one or more audio sub systems 650, one or more video displays 652, and a memory 654 having software 656 and data (e.g., digital photo or digital video) 658 stored thereon.

The NIC 632 is a hardware component that connects the device 610 to one or more computer networks and allows for communication to and from that network. Typically, the NIC 632 operates as both an Open Systems Interconnection (OSI) layer 1 (i.e., physical layer) and layer 2 (i.e., data link layer) device, as it provides physical access to a networking medium and provides a low-level addressing system through the use of Media Access Control (MAC) addresses. It allows devices to connect to each other either by using cables or wirelessly.

The one or more processors 634 may include a single or multi-core central processing unit (CPU), a graphics processing unit (GPU), other processing unit or component, or some combination thereof.

The camera 636 may be configurable to capture still images (clips), moving images (video), or both still and moving images. The camera components may include (by way of example and not limitation): digital sensor chip (e.g., CCD or CMOS), lenses, and the like.

The input subsystems 638 are physical devices designed to allow for input from, for example, a human user. The input subsystems 638 may include (by way of example and not limitation): keyboard, keypad, touchscreen, touchpad, mouse, trackball, paddle, light pen, scanner, stylus, and/or a micro-telecommunications device.

The output subsystems 640 are mechanisms for providing a tactile output to the user in a manner that is neither audio nor video based. Such tactile output is typically generated by an offset rotating motor that vibrates the device 610 to give a notification to the user.

The secondary storage 642 is typically a read-only memory (ROM), a programmable memory (such as EEPROM, EPROM, or PROM), a static read/writable memory (such as flash memory), and a mechanical read/writeable device (such as a hard drive), which may be magnetic, optical, holographic, and the like. The components of the secondary storage 642 may be internal to the device 610, attached externally to the device 610, or available via data communications (e.g., on the cloud).

At least one processor-readable medium 644 is stored on the secondary storage 642. The processor-readable medium 644 stores one or more sets of instructions (e.g., software) embodying any one or more of the methodologies or functions described herein. The instructions may also reside completely, or at least partially, within the memory 654 as software 656 and within the processor(s) 634 during execution thereof by the device 610.

The location subsystems 646 may be designed to determine the physical location of the device 610. The one or more location subsystems 646 may include (but is not limited to) an application and hardware for determining location via global positioning system (GPS) and/or by communicating with a cellular network.

The power subsystems 648 may include (but is not limited to) one or more batteries and one or more external power supplies, such as an interface to an external power supply source.

The audio subsystems 650 are configured to generate sound, noise, voices, and music. In addition, the audio subsystems 650 are configured to capture and process sound, noise, voices, and music. The audio subsystems 650 include (but is not limited to) speakers and microphones.

The video display 652 is configured to display images, videos, text, user-interfaces, and the like. The video display 652 may include (but is not limited to) a liquid crystal display (LCD), a flat panel, a solid state display or other device. The video display 652 may operate as a digital viewfinder that allows a user to preview a scene before capturing an image and/or to view a movie as it is being captured.

The memory 654 is configured to store software 656 and data (e.g., digital photo or digital video) 658 thereon. The memory 654 is a working space and may include (but is not limited to) random access memory (RAM). The memory 654 may be one or more of the following (by way of example and not limitation): volatile or non-volatile, dynamic or static, read/write-able or read only, random- or sequential-access, location- or file-addressable, and the like. The components of the memory 654 may be internal to the device 610, attached externally to the device 610, or available via data communications (e.g., on the cloud).

One of the applications (software) that may be resident in memory 654 and/or executing on the one or more processors 634 is an image-handling software module that may be used to enhance an amount of information recorded in the image file relating to the captured digital images. For example, the image-handling application may use information from other sources and/or applications to add data to the image files (e.g., JPEG (Joint Photographic Experts Group), TIFF (Tagged Image File Format), RAW, PNG (Portable Network Graphics), etc.) that the captured digital images are stored in the memory 654 and/or the secondary storage 642. This added data may be called "metadata." Specifically, the image-handling application may be configured to obtain information from other hardware, firmware, or software components to add data to the image files. Examples of other components include (but are not limited to) a location application, a calendar application, and/or a contacts application.

Additionally, the image-handling application may use data stored in the image files, contact information, calendar information, social-networking service and/or upload information to increase the ease of sharing images.

The images operated on by the image-handling application may include images captured by the user's image-capturing device (like device 610), and/or may include images obtained from sources other than the user's image-capturing device. For example, images may be transferred to device 610 using one or more wireless and/or wireline interfaces from the cloud-computing infrastructure 624.

The image-handling application may be limited to a particular type of digital image (e.g. still images (photographs), moving images (video), etc.) or may be configured to handle multiple types of images. In addition, the image-handling application may be a stand-alone application, or may be integrated into other applications or other units. Moreover, the image-handling application may be formed by a combination of functions of separate, distinct programs or units of the device 610.

Additional and Alternative Implementation Notes

Digital cameras and camera-equipped mobile phones are depicted herein (such as image-capturing as device 102 of FIG. 1 and an image-capturing telecommunications device 610 of FIG. 6) as being examples of a device implementing one or more aspects of the techniques described herein. However, other image-capturing devices may implement an aspect of the techniques described herein. Examples of other such image-capturing devices include (by are not limited to): tablet-based computer, other handheld computer, netbook, computer, digital camera, digital camcorder, handheld multimedia device, digital single-lens reflex (DSLR) camera, GPS navigational system, vehicle-based computer, any camera-equipped computing device or portable electronic.

In addition, non-camera-equipped devices may be utilized for this and other implementations of the techniques described herein. These non-camera-equipped devices or services may be those where images are stored, collected, accessed, handled, manipulated, and/or viewed. Examples of such alternative image devices and services include (but are not limited to): a photo-processing kiosk, portable and removable storage media or device (e.g., CD-ROM, DVD-ROM, other optical media, USB flash drive, flash memory card, external hard drive, etc.), electronics with radio-frequency identification (RFID), a social-networking services (e.g., Facebook™, MySpace™, Twitter™, Linkedin™, Ning™, and the like), and photo/video sharing services (e.g., Flickr™, Photobucket™, Picasa™, Shutterfly™, and the like).

One or more implementations of the techniques described herein may include an initial training session for an exemplary auto-selecting device or service to learn what makes a photo and/or video clip superlative (e.g., best or worst) in the user's opinion. This training may be repeated from time to time. This training will set the weight values of one or more of the weighted criteria. There may be various profiles for specific conditions and situations where the weighted criteria have their own trained values. Each user of the exemplary auto-selecting device or service may have their own customized weighted criteria values and profiles of such values. The exemplary may have a default set of values or profiles assigned. That default set or profiles may be extrapolated from a statistically evaluation (e.g., mean or median) of the trained values derived from multiple users.

Instead of a training session, one or more implementations may take advantage of a system of user-ratings (e.g., thumbs up/down or 1 to 5 stars) for photos and/or video clips. These user-rating are effective data for training the exemplary video-capture device to learn what makes a photo and/or video clip superlative (e.g., best or worst) in the user's opinion. In some implementations, the user may define values for one or more of the weighted criteria. This may be accomplished using, for example, slider-bar user interface for the user to adjust weights assigned to particular criteria or to categories of criteria.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. A method comprising:
   obtaining a set of digital images;
   selecting, based upon weighted selection criteria, a superlative subset of digital images of the set;
   finding an association, based upon association rules, between one or more particular digital images of the selected superlative subset and a particular user;
   notifying the particular user about the one or more associated particular digital images of the selected superlative subset;
   assigning metadata to the one or more associated particular digital images, the metadata including at least metadata that indicates that the notifying of the particular user about the one or more associated particular digital images of the selected superlative subset has occurred; and
   informing the particular user about the one or more associated particular digital images of the selected superlative subset after the assigning of the metadata.

2. A method as recited in claim 1, wherein the selecting comprises:
   ranking the digital images of the set based upon multiple weighted criteria;
   designating an allotment of top ranked digital images of the set as the selected superlative subset of digital images.

3. A method as recited in claim 1, wherein the obtaining comprises segregating a superset of digital images into the set of digital images based whether the digital images match one or more specified criteria.

4. A method as recited in claim 1, wherein the designated allotment includes digital images that are ranked amongst the set.

5. A method as recited in claim 1, wherein the designated allotment includes digital images that are top or bottom ranked amongst the set.

6. A method as recited in claim 1, further comprising calculating a cardinality of the designated allotment based upon a percentage of the set.

7. A method as recited in claim 1, wherein at least a plurality of the weighted criteria are selected from a group of digital-image properties consisting of image-acquisition location, focus, contrast, shake, red-eye, image content includes a person designated as a favorite of the user, image content includes a person in a list of contacts of the user, photo is tagged, user-added criteria, photo was auto-corrected, photo was post-processed, flash used, and social-network ranking of a digital image.

8. A method as recited in claim 1, further comprising clustering the set of digital images into multiple clusters, wherein the selected subset of digital images is selected from one or more of the multiple clusters.

9. A method as recited in claim 1, further comprising clustering the subset of digital images into multiple clusters.

10. A method as recited in claim 1, wherein the notifying comprises sending one or more links to the one or more associated particular digital images of the selected superlative subset.

11. A method as recited in claim 1, wherein the notifying comprises sending one or more copies of the one or more associated particular digital images of the selected superlative subset.

12. A method as recited in claim 1, further comprising sending, via a user-interface of a computing apparatus, the selected superlative subset of digital images to subscribed users.

13. One or more processor-readable storage devices having processor-executable instructions embodied thereon, the processor-executable instructions, when executed by one or more processors, direct the one or more processors to perform operations comprising:
   obtaining a set of digital images;
   selecting, based upon weighted selection criteria, a superlative subset of digital images of the set, the selecting comprising:
      ranking the digital images of the set based upon multiple weighted criteria;
      designating an allotment of top ranked digital images of the set as the superlative subset of digital images;
   finding an association, based upon association rules, between one or more particular digital images of the selected superlative subset and a particular user;
   notifying the particular user about the one or more associated particular digital images of the selected superlative subset;
   assigning metadata to the one or more associated particular digital images, the metadata including at least metadata that indicates that the notifying of the particular user about the one or more associated particular digital images of the selected superlative subset has occurred; and
   informing the particular user about the one or more associated particular digital images of the selected superlative subset after the assigning of the metadata.

14. One or more processor-readable storage devices as recited in claim 13, wherein the designated allotment includes digital images that are ranked amongst the set.

15. One or more processor-readable storage devices as recited in claim 13, wherein the designated allotment includes digital images that are top or bottom ranked amongst the set.

16. One or more processor-readable storage devices as recited in claim 13, wherein at least a plurality of the weighted criteria are selected from a group of digital-image properties consisting of image-acquisition location, focus, contrast, shake, red-eye, image content includes a person designated as a favorite of the user, image content includes a person in a list of contacts of the user, photo is tagged, user-added criteria, photo was auto-corrected, photo was post-processed, flash used, and social-network ranking of a digital image.

17. One or more processor-readable storage devices as recited in claim 13, wherein the notifying comprises sending one or more links to the one or more associated particular digital images of the selected superlative subset.

18. One or more processor-readable storage devices as recited in claim 13, wherein the notifying comprises sending one or more copies of the one or more associated particular digital images of the selected superlative subset.

19. One or more processor-readable storage devices having processor-executable instructions embodied thereon, the processor-executable instructions, when executed by one or more processors, direct the one or more processors to perform operations comprising:
   producing an updated set of digital images by adding one or more new digital images to a previous set of digital images;
   selecting, based upon weighted selection criteria, an updated superlative subset of digital images of the updated set, the selecting comprising:
      ranking the digital images of the updated set based upon multiple weighted criteria;
      designating an allotment of top ranked digital images of the updated set as the updated superlative subset of digital images;
   determining whether the updated superlative subset differs from a previous superlative subset, which was derived from the previous set of digital images; and
   in response to a determination that the updated and the previous superlative subsets differ:
      finding an association, based upon association rules, between one or more particular digital images of the updated selected superlative subset and a particular user;
      notifying the particular user about the one or more associated particular digital images of the updated selected superlative subset.

20. One or more processor-readable storage devices as recited in claim 19, wherein the designated allotment includes digital images that are top or bottom ranked amongst the updated set.

21. One or more processor-readable storage devices as recited in claim 19, further comprising:
   assigning metadata to one or more particular digital images of the updated selected superlative subset that indicates execution of the notifying act; and
   informing the particular user about the one or more particular digital images of the updated selected superlative subset after the assigning of the metadata.

22. A method as recited in claim 1, wherein the notifying act is performed using a first network environment and the informing act is performed using a second network environment, the first and second network environment being different.

23. One or more processor-readable storage devices as recited in claim 13, wherein the notifying act is performed using a first network environment and the informing act is performed using a second network environment, the first and second network environment being different.

* * * * *